United States Patent
Hayase

(10) Patent No.: US 12,147,517 B2
(45) Date of Patent: Nov. 19, 2024

(54) INFORMATION PROCESSING APPARATUS, INFORMATION PROCESSING METHOD, AND STORAGE MEDIUM

(71) Applicant: NEC Corporation, Tokyo (JP)

(72) Inventor: Noriaki Hayase, Tokyo (JP)

(73) Assignee: NEC CORPORATION, Tokyo (JP)

( * ) Notice: Subject to any disclaimer, the term of this patent is extended or adjusted under 35 U.S.C. 154(b) by 220 days.

(21) Appl. No.: 17/777,375

(22) PCT Filed: Nov. 18, 2019

(86) PCT No.: PCT/JP2019/045090
§ 371 (c)(1),
(2) Date: May 17, 2022

(87) PCT Pub. No.: WO2021/100090
PCT Pub. Date: May 27, 2021

(65) Prior Publication Data
US 2022/0405368 A1   Dec. 22, 2022

(51) Int. Cl.
G06F 21/00 (2013.01)
G06F 21/32 (2013.01)
G06F 21/60 (2013.01)

(52) U.S. Cl.
CPC ............ G06F 21/32 (2013.01); G06F 21/604 (2013.01); *G06F 2221/2141* (2013.01)

(58) Field of Classification Search
CPC .................. G06F 21/32; G06F 21/604; G06F 2221/2141; G07C 2209/02; G07C 9/37; G07C 9/38
See application file for complete search history.

(56) References Cited

U.S. PATENT DOCUMENTS

| 2006/0112279 A1* | 5/2006 | Cohen ............... G06F 21/34 713/186 |
| 2019/0180016 A1* | 6/2019 | Cornick ............. G06F 21/32 |
| 2019/0205399 A1* | 7/2019 | Mathur .............. G06F 16/2246 |

FOREIGN PATENT DOCUMENTS

| JP | 2006-336364 A | 12/2006 |
| JP | 2007-080149 A | 3/2007 |

(Continued)

OTHER PUBLICATIONS

Identifier Interoperability. https://www.doi.org/the-identifier/resources/factsheets/identifier-interoperability. (Year: 2017).*

(Continued)

*Primary Examiner* — Kendall Dolly

(57) ABSTRACT

An information processing apparatus in the present invention includes: a matching unit that matches biometric information acquired from a user requesting use of a management target with registered biometric information of each of a plurality of registrants; a determination unit that determines whether or not a registrant with which a matching result is that the matching is successful out of the plurality of registrants has usage authority for the management target; and an output unit that, when the matching result from the matching unit is that the matching failed, outputs first error information, and when it is determined in the determination unit that the registrant with which the matching result is that the matching is successful does not have the usage authority, outputs second error information different from the first error information.

12 Claims, 16 Drawing Sheets

(56) References Cited

FOREIGN PATENT DOCUMENTS

| | | |
|---|---|---|
| JP | 2009-025945 A | 2/2009 |
| JP | 2010-092442 A | 4/2010 |
| JP | 2017-224186 A | 12/2017 |
| JP | 2018-022452 A | 2/2018 |
| JP | 2018-106435 A | 7/2018 |

OTHER PUBLICATIONS

Extended European Search Report for EP Application No. 19953065.0, dated on Oct. 24, 2022.
International Search Report for PCT Application No. PCT/JP2019/045090, mailed on Feb. 18, 2020.

* cited by examiner

| No | ITEM NAME |
|---|---|
| 1 | PERSON ID |
| 2 | AUTHENTICATION ID |
| 3 | REGISTERED FACE IMAGE |
| 4 | FEATURE AMOUNT |
| ... | ... |

| No | ITEM NAME |
|---|---|
| 1 | PERSON ID |
| 2 | NAME |
| 3 | SEXUALITY |
| 4 | AGE |
| 5 | ADDRESS |
| 7 | EXTENDED INFORMATION EXTERNAL KEY (1) |
| 8 | EXTENDED INFORMATION EXTERNAL KEY (2) |
| 9 | EXTENDED INFORMATION EXTERNAL KEY (3) |
| 10 | EXTENDED INFORMATION EXTERNAL KEY (4) |
| 11 | EXTENDED INFORMATION EXTERNAL KEY (5) |
| ... | ... |

| No | ITEM NAME |
|---|---|
| 1 | PERSON ID |
| 2 | COMPANY CODE |
| 3 | MEMBER STORE CODE |
| 4 | SERVICE ID |
| ... | ... |

FIG. 5

| PERSON ID | HOTEL | THEME PARK | CASINO | FITNESS GYM | ... |
|---|---|---|---|---|---|
| 1000123 | ○ | ○ | ○ | ○ | ... |
| 1000124 | - | - | - | ○ | ... |
| 1000125 | ○ | - | ○ | - | ... |
| 1000126 | ○ | - | - | - | ... |
| 1000127 | ○ | ○ | - | - | ... |

| No | ITEM NAME |
|---|---|
| 1 | EXTENDED INFORMATION ID |
| 2 | FACILITY ID |
| 3 | FACILITY CATEGORY |
| 4 | EXTENDED ITEM |
| ... | ... |

FIG. 7

| FACILITY | EXTENDED ITEM |
|---|---|
| HOTEL | RESERVATION CHANNEL ID / RESERVATION NUMBER / ROOM NUMBER / NUMBER OF GUESTS / STAY DATE / CHECK-IN DATE AND TIME / CHECKOUT DATE AND TIME |
| THEME PARK | TICKET TYPE / TICKET ID / VALIDITY PERIOD / ENTRY DATE AND TIME |
| CASINO | TOKEN ID / FIRST ENTRY TIME / TOTAL STAY TIME |
| FITNESS GYM | MEMBERSHIP TYPE / VALIDITY TERM |

INFORMATION PROCESSING APPARATUS, INFORMATION PROCESSING METHOD, AND STORAGE MEDIUM

This application is a National Stage Entry of PCT/JP2019/045090 filed on Nov. 18, 2019, the contents of all of which are incorporated herein by reference, in their entirety.

TECHNICAL FIELD

The present invention relates to an information processing apparatus, an information processing method, and a storage medium.

BACKGROUND ART

Patent Literature 1 discloses an authentication device that matches a user's face image captured by a camera with a registrant's face image stored in advance in a database and authenticates the user based on the matching result. If the matching result of the face matching is that the matching is successful, the authentication device further compares a level value related to security authority set in advance for the user with a predetermined threshold and thereby makes a final decision as to whether or not the authentication is successful. The authentication device then controls an electronic lock into a locked state if the user does not satisfy both the determination conditions.

CITATION LIST

Patent Literature

PTL 1: Japanese Patent Application Laid-Open No. 2006-336364

SUMMARY OF INVENTION

Technical Problem

In Patent Literature 1, however, there is no disclosure about notification of the reason for an authentication failure or an action to be taken in a case of the authentication failure. Thus, it may be difficult to understand the situation when the authentication device determines not to authenticate a user.

Accordingly, in view of the problem described above, the present invention intends to provide an information processing apparatus, an information processing method, and a storage medium that facilitate understanding of the situation when an authentication device determines not to authenticate a user.

Solution to Problem

According to one example aspect of the present invention, provided is an information processing apparatus including: a matching unit that matches biometric information acquired from a user requesting use of a management target with registered biometric information of each of a plurality of registrants; a determination unit that determines whether or not a registrant with which a matching result is that the matching is successful out of the plurality of registrants has usage authority of the management target; and an output unit that, when the matching result from the matching unit is that the matching failed, outputs first error information, and when it is determined in the determination unit that the registrant with which the matching result is that the matching is successful does not have the usage authority, outputs second error information different from the first error information.

According to another example aspect of the present invention, provided is an information processing method including steps of: performing a matching process of matching biometric information acquired from a user requesting use of a management target with registered biometric information of each of a plurality of registrants; performing a determination process of determining whether or not a registrant with which a matching result is that the matching is successful out of the plurality of registrants has usage authority of the management target; and when the matching result from the matching process is that the matching failed, outputting first error information, and when it is determined in the determination process that the registrant with which the matching result is that the matching is successful does not have the usage authority, outputting second error information different from the first error information.

According to yet another example aspect of the present invention, provided is a storage medium storing a program that causes a computer to perform steps of: performing a matching process of matching biometric information acquired from a user requesting use of a management target with registered biometric information of each of a plurality of registrants; performing a determination process of determining whether or not a registrant with which a matching result is that the matching is successful out of the plurality of registrants has usage authority of the management target; and when the matching result from the matching process is that the matching failed, outputting first error information, and when it is determined in the determination process that the registrant with which the matching result is that the matching is successful does not have the usage authority, outputting second error information different from the first error information.

Advantageous Effects of Invention

According to the present invention, it is possible to provide an information processing apparatus, an information processing method, and a storage medium that facilitate understanding of the situation when an authentication device determines not to authenticate a user.

BRIEF DESCRIPTION OF DRAWINGS

FIG. 2 is a diagram illustrating an example of information stored in an authentication information database in the first example embodiment.

FIG. 3 is a diagram illustrating an example of information stored in a person attribute information database in the first example embodiment.

FIG. 4 is a diagram illustrating an example of information stored in an opt-in information database in the first example embodiment.

FIG. 5 is a diagram illustrating opt-in information in the first example embodiment.

FIG. 6 is a diagram illustrating an example of information stored in an extended information database in the first example embodiment.

FIG. 7 is a diagram illustrating extended items for respective facilities in the first example embodiment.

DESCRIPTION OF EMBODIMENTS

Exemplary example embodiments of the present invention will be described below with reference to the drawings. Throughout the drawings, the same elements or corresponding elements are labeled with the same references, and the description thereof may be omitted or simplified.

First Example Embodiment

Figure 1:
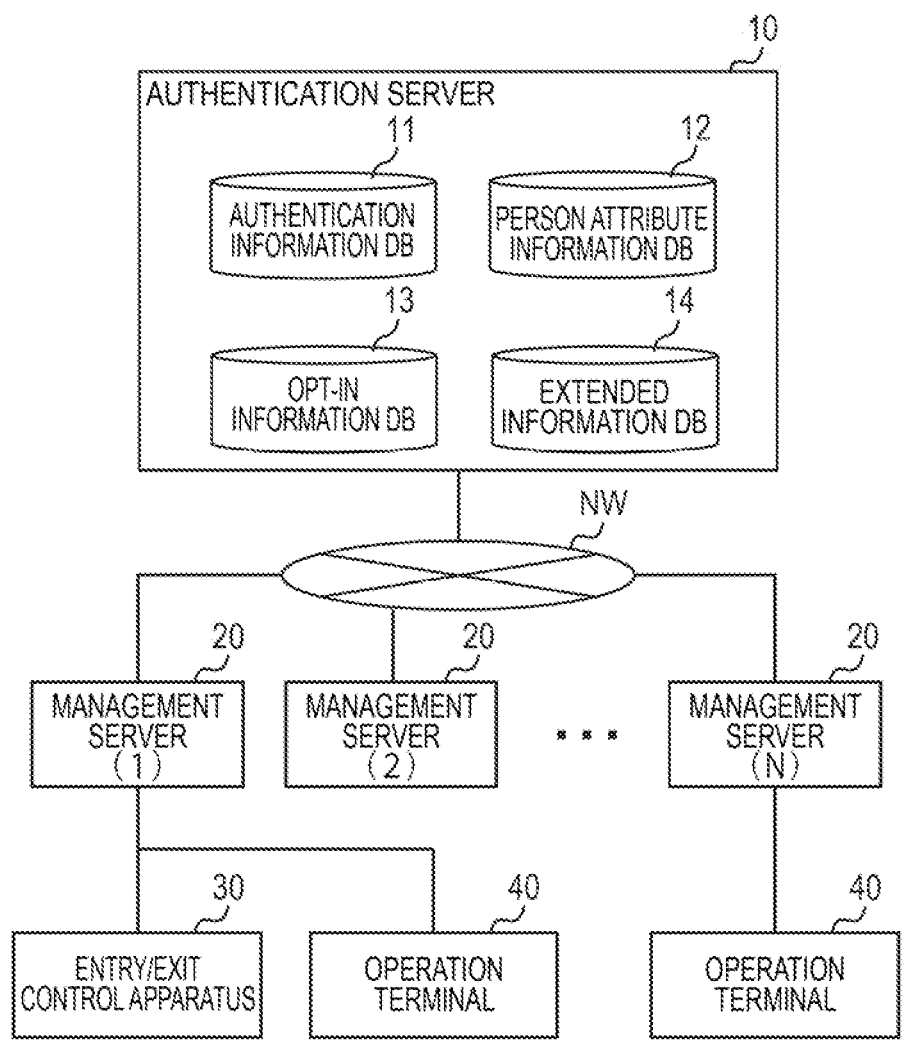
FIG. 1 is a block diagram illustrating an example of an overall configuration of a biometric authentication system in a first example embodiment.

FIG. 1 is a block diagram illustrating an example of the overall configuration of a biometric authentication system 1. As illustrated in FIG. 1, the biometric authentication system 1 is a computer system including an authentication server 10, management servers 20, an entry/exit control apparatus 30, and operation terminals 40. Each apparatus is connected to a network NW such as a local area network (LAN) or the Internet.

The biometric authentication system 1 in the present example embodiment may be applied to, for example, identity verification for entry to or exit from various facilities such as an office building, a theme park, a hotel, an event site, or the like, identity verification for immigration in an airport, a seaport, or a national boundary, identity verification in an administrative agency, identity verification in a payment process, or the like.

The authentication server 10 is an information processing apparatus (server computer) that performs an authentication process in response to an authentication request from the management server 20. Specifically, the authentication server 10 performs a process of matching a face image (or a feature amount) captured in a facility of a member store of the present system with a registered face image (or a feature amount) pre-registered in an authentication information database 11 and performs authentication of a user based on the matching result.

Further, the authentication server 10 determines whether or not the user is a person having usage authority of a facility, which is a management target, if the matching result of the matching process is that the matching is successful. Note that the expression "matching is successful" in the present example embodiment means that a matching score in a matching process is higher than or equal to a predetermined threshold. The expression "matching fails" means that the matching score is lower than the threshold.

Further, if the authentication server 10 determines that the user is a person having usage authority of a facility that is a management target, the authentication server 10 permits entry or exit, use of a service, payment for purchase of an item or use of a service, or the like at the target facility. Note that, if the user meets either a condition (A) that the matching result of face matching is that the matching fails or a condition (B) that the user does not have usage authority regarding a target facility, the authentication server 10 outputs error information corresponding to (A) or (B), respectively, to the user. Note that the error information also includes guidance information that prompts the user to cope with the error. Details thereof will be described later.

Further, the authentication server 10 has databases such as the authentication information database 11, a person attribute information database 12, an opt-in information database 13, and an extended information database 14. Note that the database included in the authentication server 10 is not limited to the above.

The authentication information database 11 is a database that stores biometric information on registrants. Although the term "biometric information" in the present example embodiment means a face image or a feature amount extracted from a face image, the biometric information is not limited to a face image or a face feature amount. As the biometric information, an iris image, a fingerprint image, a palmprint image, an auricle image, or the like may be used.

FIG. 2 is a diagram illustrating an example of information stored in the authentication information database 11. In this example, the authentication information database 11 includes a person ID, an authentication ID, a registered face image, and a feature amount as data items. The person ID is an identifier unique to each registrant. The person ID is issued when the user registers biometric information to the biometric authentication system 1. The authentication ID is an identifier that identifies an authentication process that has determined issuance of a person ID. For example, the authentication ID may be set based on the date and time of execution of an authentication process or the issuance order of a person ID.

The person attribute information database 12 is a database that stores person attribute information on a registrant. FIG. 3 is a diagram illustrating an example of information stored in the person attribute information database 12. In this example, the person attribute information database 12 includes a person ID, a name, a sexuality, an age, and an address as data items. Further, the person attribute information database 12 includes a plurality of extended information external keys as the data item. The extended information external keys are used for acquiring operation information about registrants from operation systems of member stores (for example, a stay reservation system of a hotel, a ticket sales system of a theme park, or the like). The acquired operation information is stored and managed as extended information in the extended information database 14 described later.

The opt-in information database 13 is a database that stores information related to one or more member stores for which the user permits (opts in) use of the biometric information (hereafter, referred to as "opt-in information") out of a plurality of member stores that use the authentication server 10 that is an authentication infrastructure. For example, the opt-in information may be created when the user designates some member store from a list of member stores displayed in a registration screen (not illustrated) in the biometric authentication system 1.

FIG. 4 is a diagram illustrating an example of information stored in the opt-in information database 13. In this example, the opt-in information database 13 includes a person ID, a company code, a member store code, and a service ID as data items. The company code is an identifier unique to each company. The member store code is an identifier unique to each member store belonging to the same company (hereafter, also simply referred to as "facility"). The service ID is an identifier indicating a service content to be used in a member store. For example, an identity verification service based on a face image of a public certificate with a photograph, such as a passport, if the facility is "casino", a service of measuring an elapsed time from a time of entry if there is a predetermined time limit from the time of entry to a facility to a time of exit, or the like are distinguished by respective different service IDs.

FIG. 5 is a diagram illustrating opt-in information. In this illustration, a plurality of registrant person IDs and availability of a face authentication service in a plurality of member stores (hotel/theme park/casino/fitness gym) are illustrated in a form of a table. In FIG. 5, for example, a registrant whose person ID is "1000123" permits use of a face authentication service for four facilities of "hotel", "theme park", "casino", and "fitness gym".

On the other hand, a registrant whose person ID is "1000125" permits use of a face authentication service for two member stores of "hotel" and "casino". That is, the latter registrant has usage authority for "hotel" and "casino" but does not have usage authority for "theme park" and "fitness gym". The authentication server 10 can determine whether or not the registrant has usage authority related to a target member store by referencing the opt-in information database 13 based on a registrant person ID.

The extended information database 14 is a database that stores extended information used for determining in detail whether or not the registrant has usage authority for each facility. FIG. 6 is a diagram illustrating an example of information stored in the extended information database 14. In this example, the extended information database 14 includes an extended information ID, a facility ID, a facility category, and an extended item as data items. The extended information ID is an identifier unique to each extended information and corresponds to the extended information external key described above. The facility ID is an identifier unique to each member store facility. The facility category is a category indicating a facility type. The extended item is a data item defined for each facility.

FIG. 7 is a diagram illustrating extended items on a facility basis. In this example, four of "hotel", "theme park", "casino", and "fitness gym" are illustrated as examples for the facility, and a plurality of extended items are associated with each facility. When the facility is "hotel", a reservation channel ID, a reservation number, a room number, the number of guests, a stay date, a check-in date and time, and a checkout date and time are included as the extended items. These extended items can be acquired on a registrant basis by a person ID and opt-in information described above. Thus, when no stay reservation of the user is present on a day when the user requests authentication, it is determined that the user does not have usage authority for the hotel.

Further, when the facility is "theme park", a ticket type, a ticket ID, a validity period, and an entry date and time are included as the extended items. The ticket type may be, for example, an annual ticket, a day ticket, a coupon ticket, or the like. Thus, by taking the ticket type, the validity period, or the like into consideration, it is possible to determine in detail whether or not the user is authorized to enter the theme park on a day when the user requests authentication.

Further, when the facility is "casino", a token ID, a first entry time, and a total stay time are included as the extended items. The token ID is an identifier issued separately from the person ID at the first entry time in the casino provided that a public certificate with a face photograph, such as a passport, is presented and authenticated. Thus, when the facility is "casino", conditions for entry can include a condition that a token ID has been issued to the user or a condition that the total stay time does not exceed a predetermined time limit.

Further, when the facility is "fitness gym", a membership type and a validity term are included as the extended items. The membership type is a type of a regular membership, a night membership, a weekday membership, a guest membership, or the like. The validity term is a term of validity of a membership card. Thus, when the facility is "fitness gym", conditions for entry can include a condition as to whether or not a date and a time range when the user requests authentication satisfy the condition of a membership type or a validity term.

The management server 20 is a computer such as a personal computer (PC), a server, or the like and is provided in association with each of a plurality of member stores (facilities), for example. For example, a management server 20 which manages an operation system of a hotel and a management server 20 which manages an operation system of a theme park are independent of each other.

The entry/exit control apparatus 30 is an apparatus that controls entry or exit of a user at a facility. The entry/exit control apparatus 30 may be a gate apparatus installed at an entrance or an exit of the facility, an apparatus that controls an electronic lock of a room door, or the like.

The operation terminal 40 is a terminal device used by an administrator or a staff member of a facility or a user that is an authentication subject. As the operation terminal 40, various terminals such as a PC, a tablet terminal, and a KIOSK terminal may be used in accordance with the operation detail. The operation terminal 40 may be operated by the user by himself/herself and used to register and update biometric information, person attribute information, and opt-in information, for example.

Next, the hardware configuration of each apparatus in the biometric authentication system 1 will be described with reference to FIG. 8 to FIG. 11.

Figure 8:
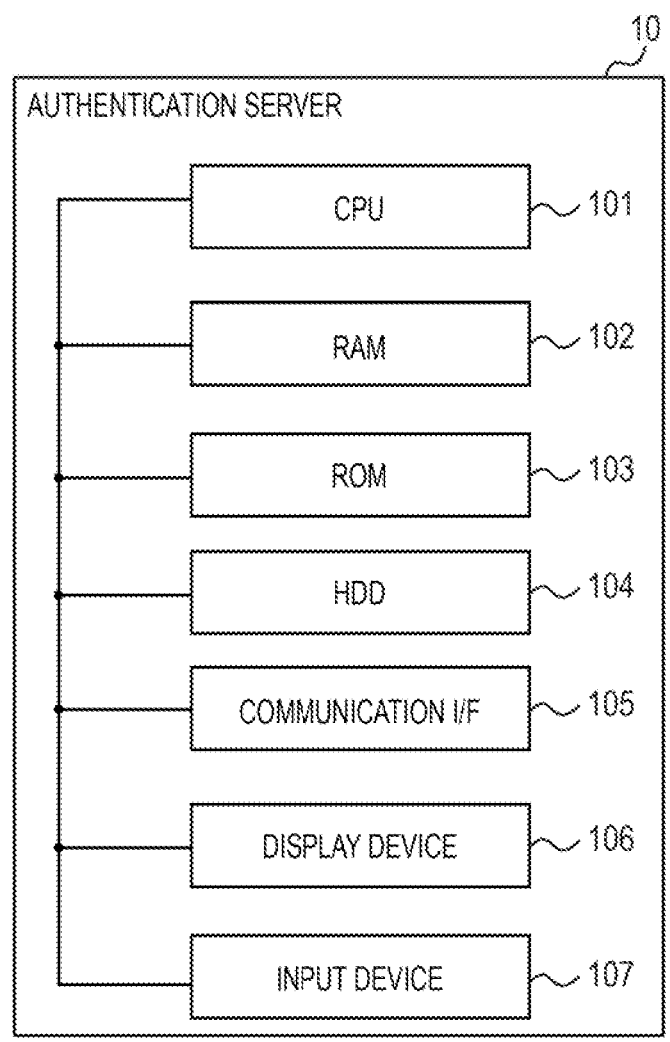
FIG. 8 is a block diagram illustrating an example of a hardware configuration of an authentication server in the first example embodiment.

FIG. 8 is a block diagram illustrating an example of the hardware configuration of the authentication server 10. As illustrated in FIG. 8, the authentication server 10 includes a central processing unit (CPU) 101, a random access memory (RAM) 102, a read only memory (ROM) 103, a hard disk drive (HDD) 104, a communication interface (I/F) 105, a display device 106, and an input device 107 as a computer that performs operation, control, and storage. The CPU 101, the RAM 102, the ROM 103, the HDD 104, the communication I/F 105, the display device 106, and the input device 107 are connected to each other via a bus, a wiring, a drive device, or the like.

The CPU 101 is a processor having a function of performing a predetermined operation in accordance with a program stored in the ROM 103 and the HDD 104 and controlling each unit of the authentication server 10. The RAM 102 is formed of a volatile storage medium and provides a temporary memory area required for the operation of the CPU 101. The ROM 103 is formed of a nonvolatile storage medium and stores necessary information such as a program used for the operation of the authentication server 10. The HDD 104 is formed of the nonvolatile storage medium and is a storage device that performs temporary storage of data acquired from the management server 20 or the like, storage of a registrant face image and a feature amount, storage of a program used for the operation of the authentication server 10, or the like.

The communication I/F 105 is a communication interface based on a specification such as the Ethernet (registered trademark), Wi-Fi (registered trademark), 4G, or the like, which is a module for communicating with another apparatus.

The display device 106 is a liquid crystal display, an organic light emitting diode (OLED) display, or the like configured to display a moving image, a still image, a text, or the like and used for presenting information to the user.

The input device 107 is a keyboard, a pointing device, a button, or the like and accepts an operation from an administrator of the authentication server 10. The display device 106 and the input device 107 may be integrally formed as a touch panel.

Figure 9:
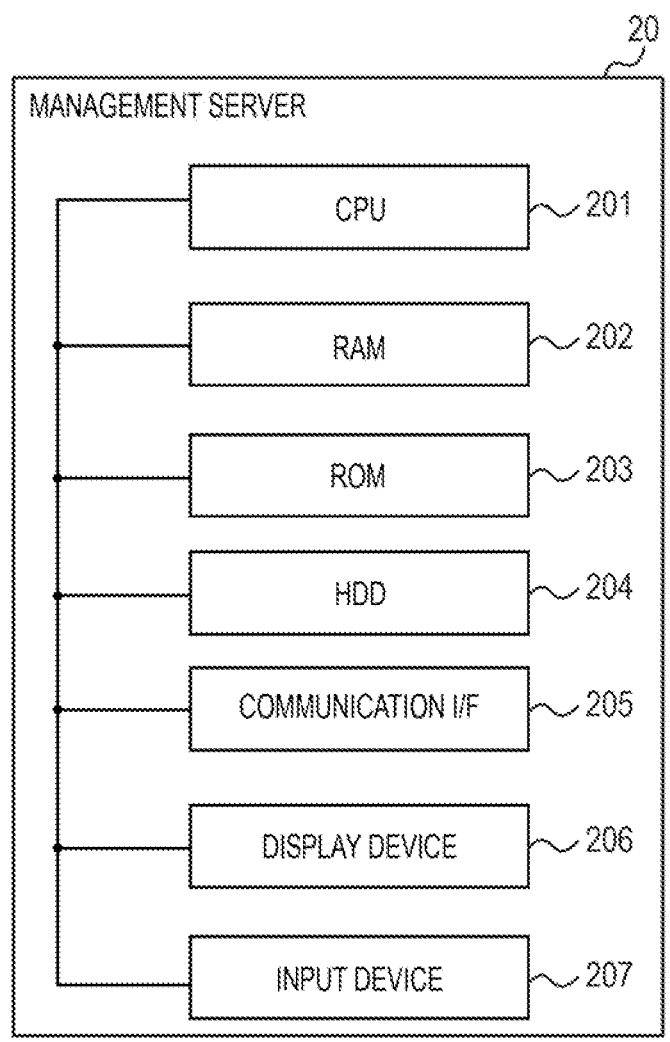
FIG. 9 is a block diagram illustrating an example of a hardware configuration of a management server in the first example embodiment.

FIG. 9 is a block diagram illustrating an example of the hardware configuration of the management server 20. As illustrated in FIG. 9, the management server 20 includes a CPU 201, a RAM 202, a ROM 203, an HDD 204, a communication I/F 205, a display device 206, and an input device 207. The CPU 201, the RAM 202, the ROM 203, the HDD 204, the communication I/F 205, the display device 206, and the input device 207 are connected to each other via a bus, a wiring, a drive device, or the like.

Figure 10:
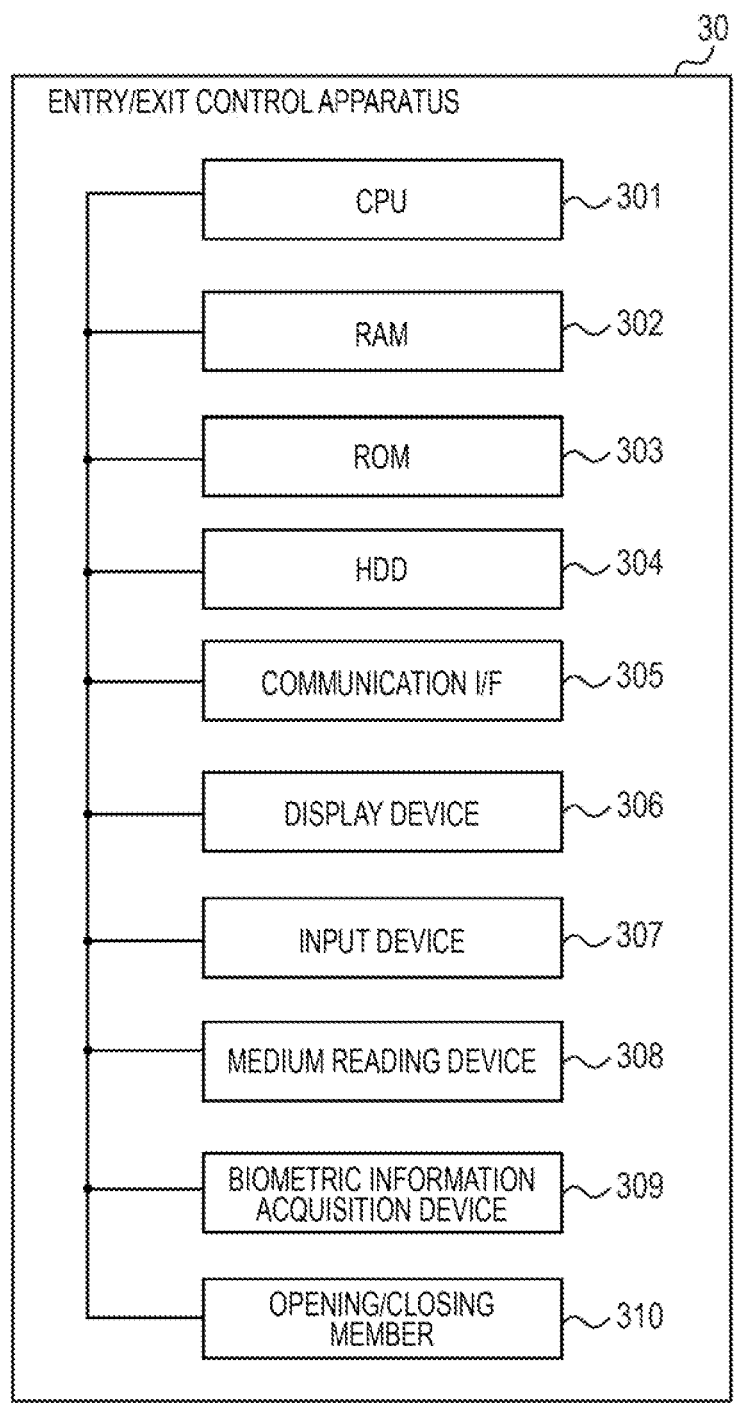
FIG. 10 is a block diagram illustrating an example of a hardware configuration of an entry/exit control apparatus in the first example embodiment.

FIG. 10 is a block diagram illustrating an example of the hardware configuration of the entry/exit control apparatus 30. As illustrated in FIG. 10, the entry/exit control apparatus 30 has a CPU 301, a RAM 302, a ROM 303, an HDD 304, a communication I/F 305, a display device 306, an input device 307, a medium reading device 308, a biometric information acquisition device 309, and an opening/closing member 310.

The medium reading device 308 is a device that reads various recording media such as a card, a ticket, and an electronic device possessed by the user and acquires information stored in the recording medium. The medium reading device 308 is formed of a code reader, an image scanner, a contactless integrated circuit (IC) reader, an optical character reader (OCR) device, or the like, for example, and acquires information from various recording media presented to a reading unit thereof.

The biometric information acquisition device 309 is a device that acquires a user's face image as biometric information. The biometric information acquisition device 309 is a digital camera that captures a face of the user standing in front of the device, for example, and captures the user's face.

The opening/closing member 310 transitions from a closed state to block passage of the user during standby to an open state to permit passage of the user under the control of the CPU 301 when identity verification of the user at the entry/exit control apparatus 30 is successful. The scheme of the opening/closing member 310 is not particularly limited, and the opening/closing member 310 may be, for example, a flapper gate in which one or more flappers provided to one side or both sides of a passage are opened and closed, a turn style gate in which three bars are revolved, or the like.

Figure 11:
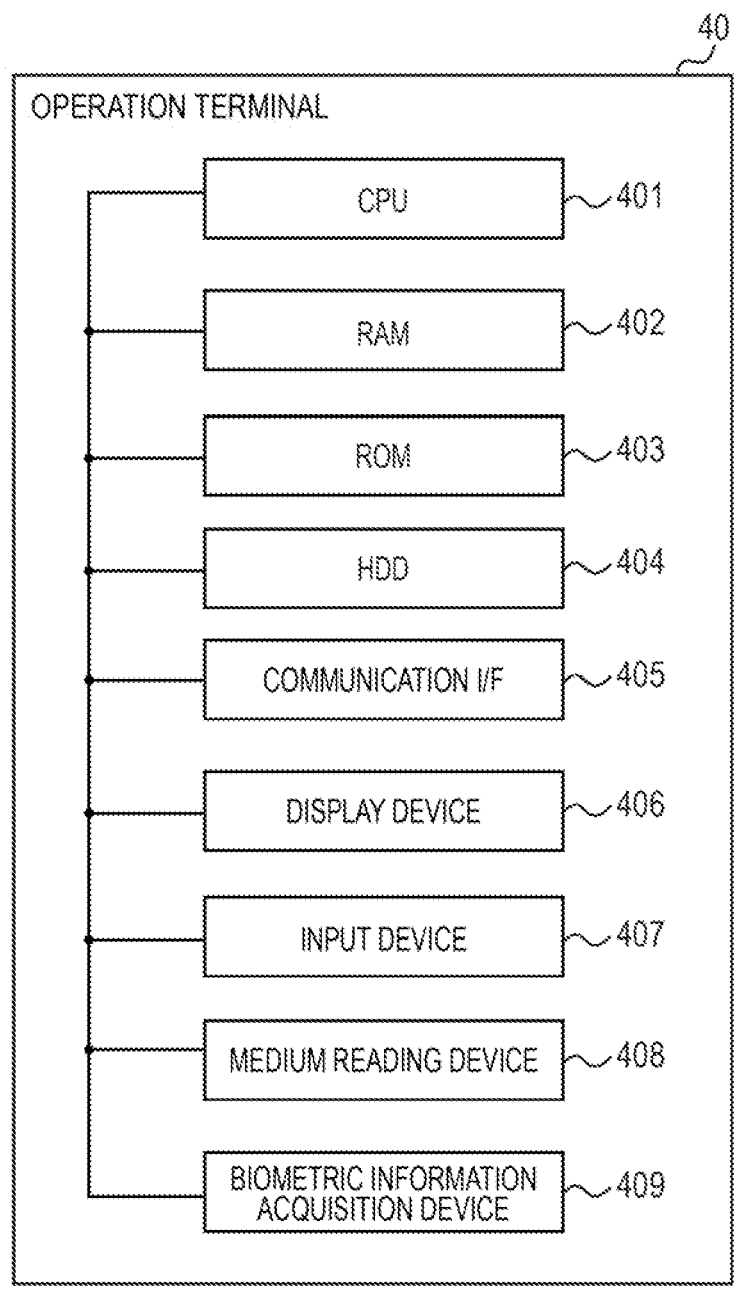
FIG. 11 is a block diagram illustrating an example of a hardware configuration of an operation terminal in the first example embodiment.

FIG. 11 is a block diagram illustrating an example of the hardware configuration of the operation terminal 40. As illustrated in FIG. 11, the operation terminal 40 has a CPU 401, a RAM 402, a ROM 403, an HDD 404, a communication I/F 405, a display device 406, an input device 407, a medium reading device 408, and a biometric information acquisition device 409.

Note that each of the hardware configurations illustrated in FIG. 8 to FIG. 11 is an example, another device may be added thereto, or some of the devices may not be provided. Further, some of the devices may be replaced with another device having substantially the same function. Further, some of the functions in the present example embodiment may be provided by another device via the network NW, or the functions of the present example embodiment may be distributed into and implemented by a plurality of devices.

Next, the operation of the biometric authentication system 1 in the present example embodiment will be described with reference to FIG. 12 to FIG. 15.

Figure 12:
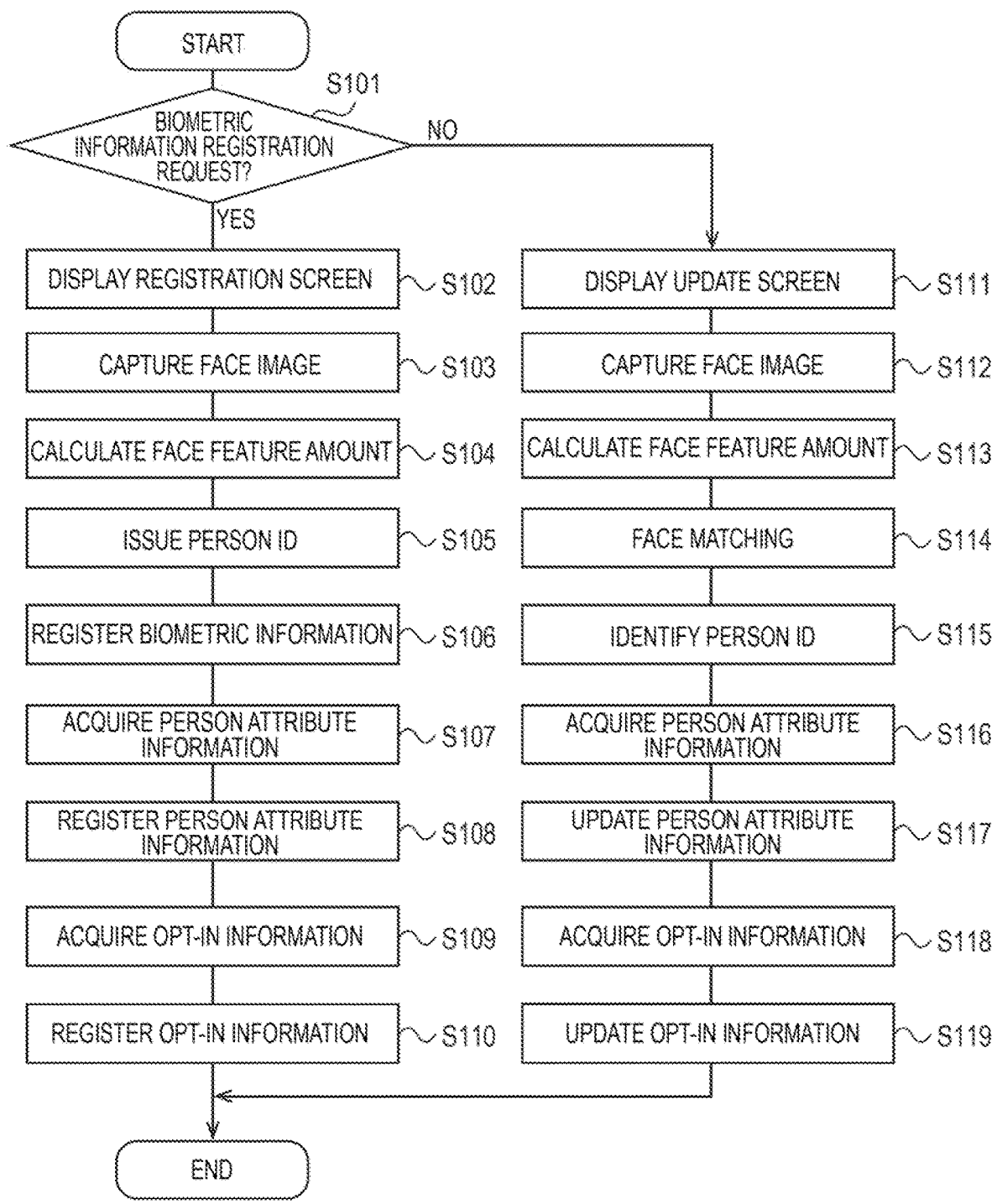
FIG. 12 is a flowchart illustrating an example of a process of a biometric authentication system in the first example embodiment.

FIG. 12 is a flowchart illustrating an example of the process of the biometric authentication system 1. This process is performed when the user performs registration or update of biometric information, person attribute information, and opt-in information on the biometric authentication system 1.

In this example, a case where the user accesses the authentication server 10 via the management server 20 from the operation terminal 40 provided to each facility and performs registration or update of various information will be described as an example. Note that the device that can perform registration or update of various information is not limited to only the operation terminal 40. The user may access a website of the biometric authentication system 1 via the network NW from a user terminal (not illustrated) and perform registration or update of various information.

First, in response to receiving request data from the operation terminal 40 via the management server 20, the authentication server 10 determines whether or not the request data is a biometric information registration request (step S101).

Herein, if the authentication server 10 determines that the request data is a biometric information registration request (step S101, YES), the process proceeds to step S102.

In contrast, if the authentication server 10 determines that the request data is not a biometric information registration request (step S101, NO), the process proceeds to step S111.

In step S102, the authentication server 10 causes a registration screen for biometric information, person attribute information, and opt-in information to be displayed on the display device 406 of the operation terminal 40 via the management server 20. In the registration screen, the user is able to set registered biometric information and usage authority for each facility by operating the input device 407.

Next, the operation terminal 40 captures a face image of the user by the biometric information acquisition device 409 during the registration screen being displayed (step S103) and then transmits a captured face image to the authentication server 10.

Next, in response to receiving the face image captured by the operation terminal 40, the authentication server 10 calculates a feature amount from the face image (step S104) and issues a person ID unique to the user who is a registrant (step S105). Note that, prior to issuance of a person ID, the authentication information database 11 may be searched based on a feature amount to confirm that the user's face image is not yet registered. Further, in registration, a face image may be read from a passport, a license, or the like, and a read face image may be matched with a captured face image to perform identity verification.

Next, the authentication server 10 registers the face image and the feature amount that are user biometric information to the authentication information database 11 (step S106).

Next, in response to acquiring person attribute information input by the user in an entry form in the registration screen displayed on the display device 406 of the operation terminal 40 (step S107), the authentication server 10 registers the acquired person attribute information to the person attribute information database 12 in association with the person ID (step S108). Further, the method of acquiring person attribute information is not limited to the method of acquiring information input on the registration screen as with step S107. For example, a recording medium (a two-dimensional barcode, a magnetic card, a passport, an IC card, or the like) in which person attribute information on the user is recorded may be optically or electromagnetically read. The same applies for biometric information or opt-in information.

Next, in response to acquiring opt-in information input by the user in an entry form in the registration screen (step S109), the authentication server 10 registers the acquired opt-in information to the opt-in information database 13 in association with the person ID (step S110) and ends the process.

In step S111, the authentication server 10 causes an update screen for biometric information, person attribute information, and opt-in information to be displayed on the display device 406 of the operation terminal 40. In the update screen, the user is able to input information that changes the registered biometric information and the usage authority for each facility registered in the database, respectively, by operating the input device 407.

Next, the operation terminal 40 captures a face image of the user by the biometric information acquisition device 409 during the update screen being displayed (step S112) and then transmits a captured face image to the authentication server 10.

Next, in response to receiving the face image captured at the operation terminal 40, the authentication server 10 calculates a feature amount from the face image (step S113). Next, the authentication server 10 performs face matching of the captured face image (or feature amount) with registered face images (or registered feature amounts) stored in the authentication information database 11 (step S114).

Next, the authentication server 10 identifies the person ID of the user based on the matching result of the face matching (step S115). Specifically, the authentication server 10 identifies the person ID of a registrant whose matching score in step S114 is higher than or equal to a predetermined threshold out of a plurality of registrants. Note that, when respective matching scores of a plurality of registrants are higher than or equal to the threshold, a plurality of person IDs may be identified, or only the person ID of a registrant whose matching score is the highest may be identified.

Next, the authentication server 10 acquires person attribute information input by the user in an entry form in the update screen displayed on the operation terminal 40 (step S116) and then updates the person attribute information stored in the person attribute information database 12 based on the acquired person attribute information and the person ID (step S117). Note that, when the user does not wish to change the person attribute information, the process of step S116 and step S117 will be omitted. Further, as with the case of step S107, the method of acquiring person attribute information is not limited to the method of acquiring information input on the update screen.

Next, the authentication server 10 acquires the opt-in information input by the user in the entry form in the update screen (step S118), then updates the opt-in information stored in the opt-in information database 13 based on the acquired opt-in information and the person ID (step S119), and ends the process. Note that, when the user does not wish to change the opt-in information, the process of step S118 and step S119 will be omitted.

Figure 13:
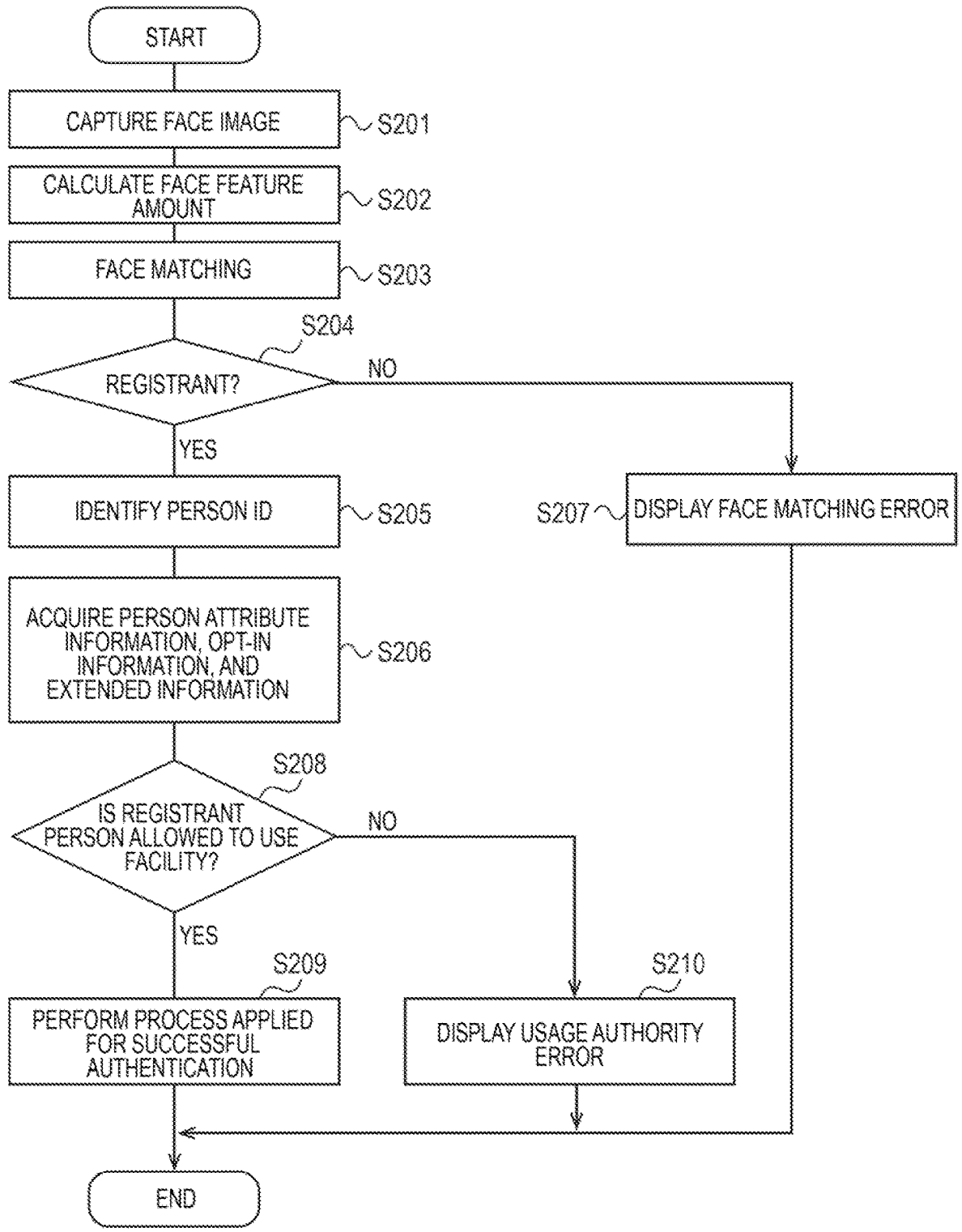
FIG. 13 is a flowchart illustrating an example of a process of the biometric authentication system in the first example embodiment.

FIG. 13 is a flowchart illustrating an example of the process of the biometric authentication system 1. For example, this process is performed when the user requests use of a facility (entry or exit, payment, or the like) in a member store facility. In this example, a case where the user requests entry to a facility at the entry/exit control apparatus 30 installed in a member store facility will be described as an example.

First, the entry/exit control apparatus 30 captures a face image of the user by the biometric information acquisition device 309 (step S201) and then transmits the captured face image to the authentication server 10 via the management server 20.

Next, in response to receiving the face image captured at the entry/exit control apparatus 30, the authentication server 10 calculates a feature amount from the face image (step S202). Next, the authentication server 10 performs face matching of the captured face image (or the feature amount) with registered face images (or the registered feature amounts) stored in the authentication information database 11 (step S203).

Next, the authentication server 10 determines whether or not the user is a registrant of a person ID based on the matching result of the face matching (step S204).

Herein, if the authentication server 10 determines that the user is a registrant (step S204, YES), the process proceeds to step S205.

In contrast, if the authentication server 10 determines that the user is not a registrant (step S204, NO), the process proceeds to step S207.

In step S205, the authentication server 10 references the authentication information database 11 and identifies a person ID of the registrant with which the result of matching of the user is that the matching is successful.

The authentication server 10 then searches the person attribute information database 12, the opt-in information database 13, and the extended information database 14 based on the identified person ID, respectively, and acquires person attribute information, opt-in information, and extended information related to the registrant (step S206). The process then proceeds to step S208.

In step S207, the authentication server 10 causes a guidance screen indicating a face matching error to be displayed on the display device 306 of the entry/exit control apparatus 30 based on the result of the face matching (the matching failed).

Figure 14:
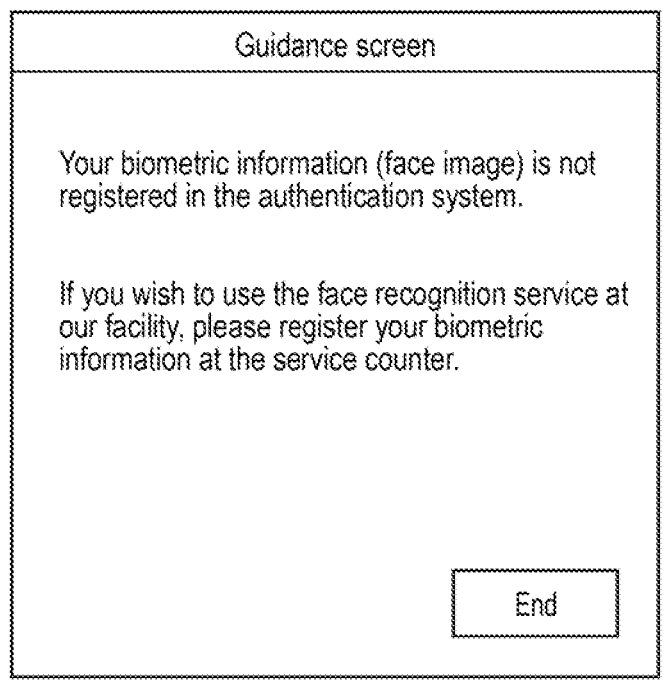
FIG. 14 is a diagram illustrating an example of a screen displayed by the entry/exit control apparatus in the first example embodiment.

FIG. 14 is a diagram illustrating an example of a screen displayed by the entry/exit control apparatus 30. Herein, an error message indicating a face matching error ("Your biometric information (face image) is not registered in the authentication system.") is displayed on the guidance screen. This enables the user to know the reason for the authentication failure.

Further, a guidance message indicating how the user can cope with the face matching error ("If you wish to use the face recognition service at our facility, please register your biometric information at the service counter.") is display together in the same screen. This enables the user not only to easily understand the situation of the authentication failure but also to know an action to be taken for overcoming the situation of the authentication failure.

Note that the error message illustrated in FIG. 14 is a mere example, and there are various actions to be taken. For example, the display screen on the entry/exit control apparatus 30 may transition from a guidance screen to a biometric information registration screen so that biometric information can be registered at the current place. Further, to avoid interference with a subsequent user authentication process, such a system configuration that causes the registration screen to be displayed in a coordinated manner on a self-service terminal (for example, the operation terminal 40) installed near a gate (the entry/exit control apparatus 30) may be employed. In these cases, there is an advantage that the user does not have to go to the service counter.

In step S208, based on the opt-in information and the extended information, the authentication server 10 determines whether or not the registrant with which the result of matching of the user is that the matching is successful is a person allowed to use the facility. Herein, if the authentication server 10 determines that the registrant is a person allowed to use the facility (step S208, YES), the process proceeds to step S209.

In contrast, if the authentication server 10 determines that the registrant is not a person allowed to use the facility (step S208, NO), the process proceeds to step S210.

In step S209, the authentication server 10 performs a process applied for successful authentication (step S209) and ends the process. Specifically, to let the user who is authenticated as the same person as a registrant enter the facility, the authentication server 10 causes the entry/exit control apparatus 30 to perform control to open the opening/closing member 310 via the management server 20.

In step S210, the authentication server 10 causes the display device 306 of the entry/exit control apparatus 30 to display a guidance screen indicating that the user does not have usage authority for the facility.

Figure 15:
FIG. 15 is a diagram illustrating an example of a screen displayed by the entry/exit control apparatus in the first example embodiment.

FIG. 15 is a diagram illustrating an example of a screen displayed by the entry/exit control apparatus 30. In this example, an error message indicating that the user does not have usage authority for the facility ("You have not registered our facility in the list of facilities available with the face recognition service.") is displayed on the guidance screen. This enables the user to know the reason for the authentication failure.

Further, a guidance message indicating how the user can cope with the error about usage authority ("If you wish to use the face recognition service at our facility, please update the list of available facilities at the service counter.") is display together in the same screen. This enables the user not only to easily understand the situation of the authentication failure but also to know an action to be taken for overcoming the situation of the authentication failure.

Note that the error message illustrated in FIG. 15 is a mere example, and there are various actions to be taken. For example, the display screen on the entry/exit control apparatus 30 may transition from a guidance screen to an update screen for the list of available facilities so that the list of available facilities can be updated at the current place. Further, to avoid interference with a subsequent user authentication process, such a system configuration that causes the update screen to be displayed in a coordinated manner on a self-service terminal (for example, the operation terminal 40) installed near a gate (the entry/exit control apparatus 30) may be employed. In these cases, there is an advantage that the user does not have to go to the service counter.

As described above, according to the present example embodiment, if the matching result in a process of matching of the user who requests use of a management target (for example, a facility) with a registrant is that the matching failed, the authentication server 10 outputs first error information (face matching error) indicating that the user is not a registrant, and if it is determined that a registrant does not have usage authority for the management target in the determination process of determining usage authority, the authentication server 10 outputs second error information indicating no usage authority (usage authority error) unlike the first error information. That is, if the authentication server 10 determines not to authenticate the user, the user is notified of the reason for the authentication failure and an action to be taken in accordance with the reason. This enables the user to easily understand the registration status to the face authentication service or the registration status of a facility to be used with the face authentication service. Further, the user is able to easily cope with an authentication result of an authentication failure.

Second Example Embodiment

Figure 16:
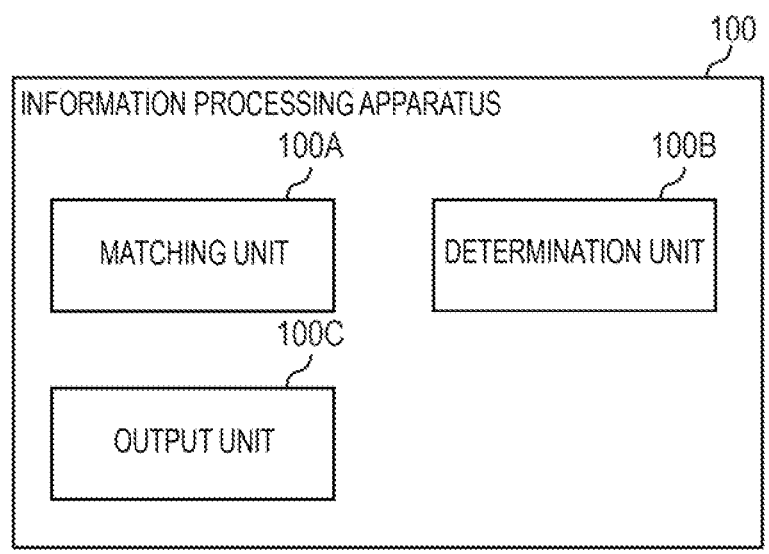
FIG. 16 is a block diagram illustrating an example of a configuration of an information processing apparatus in a second example embodiment.

FIG. 16 is a block diagram illustrating an example of the configuration of an information processing apparatus 100 in a second example embodiment. The information processing apparatus 100 includes a matching unit 100A, a determination unit 100B, and an output unit 100C. The matching unit 100A matches biometric information acquired from a user requesting use of a management target with registered biometric information of each of a plurality of registrants. The determination unit 100B determines whether or not a registrant with which a matching result is that the matching is successful out of the plurality of registrants has usage authority for the management target. When the matching result from the matching unit 100A is that the matching failed, the output unit 100C outputs first error information, and when it is determined in the determination unit 100B that the registrant with which the matching result is that the matching is successful does not have usage authority for the management target, the output unit 100C outputs second error information different from the first error information. According to the present example embodiment, it is possible to facilitate understanding of the situation when an authentication device determines not to authenticate the user.

Modified Example Embodiments

The present invention is not limited to the example embodiments described above and can be changed as appropriate within the scope not departing from the spirit of the present invention. For example, an example in which a configuration of a part of any of the example embodiments is added to another example embodiment or an example in which a configuration of a part of any of the example embodiments is replaced with a configuration of a part of another example embodiment is also an example embodiment of the present invention.

Although the case where the error information is information presented to the user who is an authentication subject has been described in the above example embodiments, the entity to which the error information is presented is not limited to only the user. For example, the reason for an authentication failure and an action to be taken may be presented to an administrator of a facility who is not an authentication subject. Further, the error information may be presented to both the user and the administrator. This achieves the same advantageous effect as in the case where the error information is presented to the user. That is, the administrator may easily understand the registration status to a user face authentication service or the registration status of the facility available with a face authentication service. As a result, the administrator may easily cope with an authentication result that the authentication server 10 does not authenticate the user.

Although the case where the user uses a facility has been described in the above example embodiments, the usage authority is not limited to only the usage authority related to a facility. For example, in a case of a system that manages company supplies, it is possible to use face authentication to perform rental management of a supply by defining usage authority for (authorizing use of) the supply on an employee basis. Similarly, the usage authority may include access right to a database or the like.

Although the system configuration in which the authentication server 10 has the functions of the matching process, the determination process, and the output process has been described in the above example embodiments. However, another apparatus (the management server 20, the entry/exit control apparatus 30, the operation terminal 40, and the like) may include some or all of the functions of the authentication server 10. For example, when the authentication server 10 centrally manages biometric information, opt-in information, and the like of the user, a system configuration in which the entry/exit control apparatus 30 or the like of each facility reference the database of the authentication server 10 to perform the matching process or the determination process may be employed.

The scope of each of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the individual program itself.

As the storage medium, for example, a floppy (registered trademark) disk, a hard disk, an optical disk, a magneto-optical disk, a CD-ROM, a magnetic tape, a nonvolatile memory card, or the like can be used. Further, the scope of each of the example embodiments also includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

An information processing apparatus comprising:
  a matching unit that matches biometric information acquired from a user requesting use of a management target with registered biometric information of each of a plurality of registrants;
  a determination unit that determines whether or not a registrant with which a matching result is that the matching is successful out of the plurality of registrants has usage authority for the management target; and
  an output unit that, when the matching result from the matching unit is that the matching failed, outputs first error information, and when it is determined in the determination unit that the registrant with which the matching result is that the matching is successful does not have the usage authority, outputs second error information different from the first error information.

(Supplementary Note 2)

The information processing apparatus according to supplementary note 1, wherein the first error information includes information indicating that the matching failed.

(Supplementary Note 3)

The information processing apparatus according to supplementary note 1 or 2, wherein the second error information includes information indicating that the user does not have the usage authority.

(Supplementary Note 4)

The information processing apparatus according to any one of supplementary notes 1 to 3, wherein the first error information includes information that prompts an informed person to register the biometric information.

(Supplementary Note 5)

The information processing apparatus according to any one of supplementary notes 1 to 4, wherein the second error information includes information that prompts an informed person to register the usage authority.

(Supplementary Note 6)

The information processing apparatus according to any one of supplementary notes 1 to 5, wherein each of the first error information and the second error information is information presented to the user.

(Supplementary Note 7)

The information processing apparatus according to any one of supplementary notes 1 to 5, wherein each of the first error information and the second error information is information presented to an administrator different from the user.

(Supplementary Note 8]

The information processing apparatus according to any one of supplementary notes 1 to 7 further comprising a storage unit that stores the registered biometric information and the usage authority related to each of a plurality of facilities in association with each other for each of the registrants.

(Supplementary Note 9)

The information processing apparatus according to supplementary note 8 further comprising:
  a setting unit that sets the registered biometric information and the usage authority for each of the facilities; and
  a control unit that issues an identifier unique to each of the registrants and registers the set registered biometric information and the set usage authority to the storage unit in association with the identifier.

(Supplementary Note 10)

The information processing apparatus according to any one of supplementary notes 1 to 9, wherein the biometric information is any of a face image, an iris image, a fingerprint image, an auricle image, and a palmprint image.

(Supplementary Note 11)

An information processing method comprising:
  performing a matching process of matching biometric information acquired from a user requesting use of a management target with registered biometric information of each of a plurality of registrants;
  performing a determination process of determining whether or not a registrant with which a matching result is that the matching is successful out of the plurality of registrants has usage authority for the management target; and when the matching result from the matching process is that the matching failed, outputting first error information, and when it is determined in the determination process that the registrant with which the matching result is that the matching is successful does not have the usage authority, outputting second error information different from the first error information.

(Supplementary Note 12)

A storage medium storing a program that causes a computer to perform:

performing a matching process of matching biometric information acquired from a user requesting use of a management target with registered biometric information of each of a plurality of registrants;

performing a determination process of determining whether or not a registrant with which a matching result is that the matching is successful out of the plurality of registrants has usage authority for the management target; and when the matching result from the matching process is that the matching failed, outputting first error information, and when it is determined in the determination process that the registrant with which the matching result is that the matching is successful does not have the usage authority, outputting second error information different from the first error information.

REFERENCE SIGNS LIST

NW network
1 biometric authentication system
10 authentication server
11 authentication information database
12 person attribute information database
13 opt-in information database
14 extended information database
20 management server
30 entry/exit control apparatus
40 operation terminal
100 information processing apparatus
100A matching unit
100B determination unit
100C output unit

The invention claimed is:

1. An information processing apparatus comprising:
at least one memory storing instructions; and
at least one processor configured to execute the instructions to perform operations comprising:
referring to a first database that stores registered biometric information of each of a plurality of registrants;
matching biometric information acquired from a user requesting use of a target service with the registered biometric information of each of the plurality of registrants, to identify whether there are one or more matching registrants of which the registered biometric information matches the biometric information acquired from the user;
when there are no matching registrants of which the registered biometric information matches the biometric information acquired from the user, displaying first error information on an entry/exit control apparatus and prohibiting the user from using the target service;
when there are the one or more matching registrants of which the registered biometric information matches the biometric information acquired from the user:
referring to a second database that stores information related to one or more services for which each registrant has authorized use of the registered biometric information thereof, among a plurality of services for which the registrant can authorize use of the registered biometric information thereof;
determining whether or not any of the one or more services for which any matching registrant has authorized use is the target service;
when any of the one or more services for which any matching registrant has authorized use is the target service, permitting the user to use the target service; and
when none of the one or more services for which any matching registrant has authorized use of the target service, displaying second error information, different from the first error information, on the entry/exit control apparatus and prohibiting the user from using the target service,
wherein the first error information and the second error information include guidance information to prompt the user as to how to proceed,
wherein the guidance information of the first error information is information for guiding that the user needs to register the biometric information of the user, and
wherein the guidance information of the second error information is information for guiding that the user needs to update usage authority of the user to use the target service.

2. The information processing apparatus according to claim 1, wherein the first error information includes information indicating that the matching failed.

3. The information processing apparatus according to claim 1, wherein the second error information includes information indicating that the user does not have the usage authority.

4. The information processing apparatus according to claim 1, wherein the first error information includes information that prompts an informed person to register the biometric information.

5. The information processing apparatus according to claim 1, wherein the second error information includes information that prompts an informed person to register the usage authority.

6. The information processing apparatus according to claim 1, wherein each of the first error information and the second error information is information presented to the user.

7. The information processing apparatus according to claim 1, wherein each of the first error information and the second error information is information presented to an administrator different from the user.

8. The information processing apparatus according to claim 1, wherein the operations further comprise:
storing the registered biometric information and the usage authority related to each of a plurality of facilities in association with each other for each of the registrants in a storage device.

9. The information processing apparatus according to claim 8, wherein the operations further comprise:
setting the registered biometric information and the usage authority for each of the facilities; and
issuing an identifier unique to each of the registrants and registering the set registered biometric information and the set usage authority in the storage device in association with the identifier.

10. The information processing apparatus according to claim 1, wherein the biometric information is any of a face image, an iris image, a fingerprint image, an auricle image, and a palmprint image.

11. An information processing method performed by a computer and comprising:
   referring to a first database that stores registered biometric information of each of a plurality of registrants;
   matching biometric information acquired from a user requesting use of a target service with the registered biometric information of each of the plurality of registrants, to identify whether there are one or more matching registrants of which the registered biometric information matches the biometric information acquired from the user;
   when there are no matching registrants of which the registered biometric information matches the biometric information acquired from the user, displaying first error information on an entry/exit control apparatus and prohibiting the user from using the target service;
   when there are the one or more matching registrants of which the registered biometric information matches the biometric information acquired from the user:
      referring to a second database that stores information related to one or more services for which each registrant has authorized use of the registered biometric information thereof, among a plurality of services for which the registrant can authorize use of the registered biometric information thereof;
      determining whether or not any of the one or more services for which any matching registrant has authorized use is the target service;
      when any of the one or more services for which any matching registrant has authorized use is the target service, permitting the user to use the target service; and
      when none of the one or more services for which any matching registrant has authorized use of the target service, displaying second error information, different from the first error information, on the entry/exit control apparatus and prohibiting the user from using the target service,
   wherein the first error information and the second error information include guidance information to prompt the user as to how to proceed,
   wherein the guidance information of the first error information is information for guiding that the user needs to register the biometric information of the user, and
   wherein the guidance information of the second error information is information for guiding that the user needs to update usage authority of the user to use the target service.

12. A non-transitory storage medium storing a program executable that when executed by a computer causes the computer to perform processing comprising:
   referring to a first database that stores registered biometric information of each of a plurality of registrants;
   matching biometric information acquired from a user requesting use of a target service with the registered biometric information of each of the plurality of registrants, to identify whether there are one or more matching registrants of which the registered biometric information matches the biometric information acquired from the user;
   when there are no matching registrants of which the registered biometric information matches the biometric information acquired from the user, displaying first error information on an entry/exit control apparatus and prohibiting the user from using the target service;
   when there are the one or more matching registrants of which the registered biometric information matches the biometric information acquired from the user:
      referring to a second database that stores information related to one or more services for which each registrant has authorized use of the registered biometric information thereof, among a plurality of services for which the registrant can authorize use of the registered biometric information thereof;
      determining whether or not any of the one or more services for which any matching registrant has authorized use is the target service;
      when any of the one or more services for which any matching registrant has authorized use is the target service, permitting the user to use the target service; and
      when none of the one or more services for which any matching registrant has authorized use of the target service, displaying second error information, different from the first error information, on the entry/exit control apparatus and prohibiting the user from using the target service,
   wherein the first error information and the second error information include guidance information to prompt the user as to how to proceed,
   wherein the guidance information of the first error information is information for guiding that the user needs to register the biometric information of the user, and
   wherein the guidance information of the second error information is information for guiding that the user needs to update usage authority of the user to use the target service.

* * * * *